United States Patent
Koide

(10) Patent No.: US 8,718,703 B2
(45) Date of Patent: May 6, 2014

(54) RADIO COMMUNICATION APPARATUS AND CONTROL METHOD THEREOF

(75) Inventor: Yuji Koide, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 500 days.

(21) Appl. No.: 11/570,024

(22) PCT Filed: Sep. 29, 2005

(86) PCT No.: PCT/JP2005/018480
§ 371 (c)(1),
(2), (4) Date: Dec. 4, 2006

(87) PCT Pub. No.: WO2006/036005
PCT Pub. Date: Apr. 6, 2006

(65) Prior Publication Data
US 2007/0180071 A1 Aug. 2, 2007

(30) Foreign Application Priority Data

Sep. 30, 2004 (JP) ................. 2004-287652

(51) Int. Cl.
| | |
|---|---|
| H04M 1/00 | (2006.01) |
| H04W 72/00 | (2009.01) |
| H04W 74/00 | (2009.01) |
| G06F 15/16 | (2006.01) |
| G06F 3/12 | (2006.01) |
| H04W 4/00 | (2009.01) |
| H04B 7/00 | (2006.01) |

(52) U.S. Cl.
USPC ........ 455/552.1; 455/455; 455/450; 709/227; 709/228; 709/229; 358/1.15; 370/338; 370/310

(58) Field of Classification Search
USPC ............. 455/435.2, 41.2, 90.2, 552.1, 553.1, 455/454, 63.1, 445, 455, 450, 296, 453; 709/227–229; 370/338, 310; 358/1.15
See application file for complete search history.

(56) References Cited

U.S. PATENT DOCUMENTS

2002/0037736 A1* 3/2002 Kawaguchi et al. .......... 455/518
2002/0085520 A1 7/2002 Sydon et al.
(Continued)

FOREIGN PATENT DOCUMENTS

CN 1290438 A 4/2001
EP 0756397 A 1/1997
(Continued)

OTHER PUBLICATIONS

PCT International Search Report dated Nov. 15, 2005.
(Continued)

*Primary Examiner* — Jinsong Hu
*Assistant Examiner* — Dung Hong
(74) *Attorney, Agent, or Firm* — Cowan, Liebowitz & Latman, P.C.

(57) ABSTRACT

A radio communication apparatus comprises a radio communication setting storage unit that stores a first radio communication setting for performing radio communication on a first radio network, and a second radio communication setting for performing radio communication on a second radio network which is different from said first radio network; a radio communication unit that performs radio communication using one of the first and second radio communication settings; and a radio communication setting switching unit that requests another radio communication apparatus in the first radio network to switch the first radio communication setting to the second radio communication setting in order to join the second radio network.

24 Claims, 11 Drawing Sheets

(56) References Cited

U.S. PATENT DOCUMENTS

| | | |
|---|---|---|
| 2002/0147819 A1* | 10/2002 | Miyakoshi et al. ............ 709/228 |
| 2002/0150249 A1 | 10/2002 | Ohkita et al. |
| 2003/0050009 A1* | 3/2003 | Kurisko et al. ................. 455/41 |
| 2003/0092395 A1 | 5/2003 | Gassho et al. |
| 2003/0100335 A1* | 5/2003 | Gassho et al. ................ 455/552 |
| 2003/0189644 A1* | 10/2003 | Kikugawa .................. 348/207.2 |
| 2003/0236064 A1* | 12/2003 | Shiohara et al. .................. 455/1 |
| 2004/0063458 A1* | 4/2004 | Hori et al. .................. 455/554.2 |
| 2004/0143765 A1* | 7/2004 | Kazawa et al. ............... 713/202 |
| 2005/0165916 A1* | 7/2005 | Cromer et al. ................ 709/220 |

FOREIGN PATENT DOCUMENTS

| | | |
|---|---|---|
| JP | 2002-111679 | 4/2002 |
| JP | 2002-290418 A | 10/2002 |
| JP | 2003-152695 | 5/2003 |
| JP | 2004-202779 | 7/2004 |
| WO | 99/41876 A | 8/1999 |

OTHER PUBLICATIONS

The above references were cited in a Dec. 15, 2009 Japanese Office Action which is enclosed without English Translation, that issued in Japanese Patent Application No. 2004-287652.

The above references were cited in a Jul. 6, 2011; Supplementary European Search Report which is enclosed of the counterpart European Patent Application No. 05790143.1.

The above reference was cited in a Oct. 24, 2013 Chinese Office Action, which is enclosed with English Translation, that issued in Chinese Patent Application No. 201110210761.6.

* cited by examiner

F I G. 5
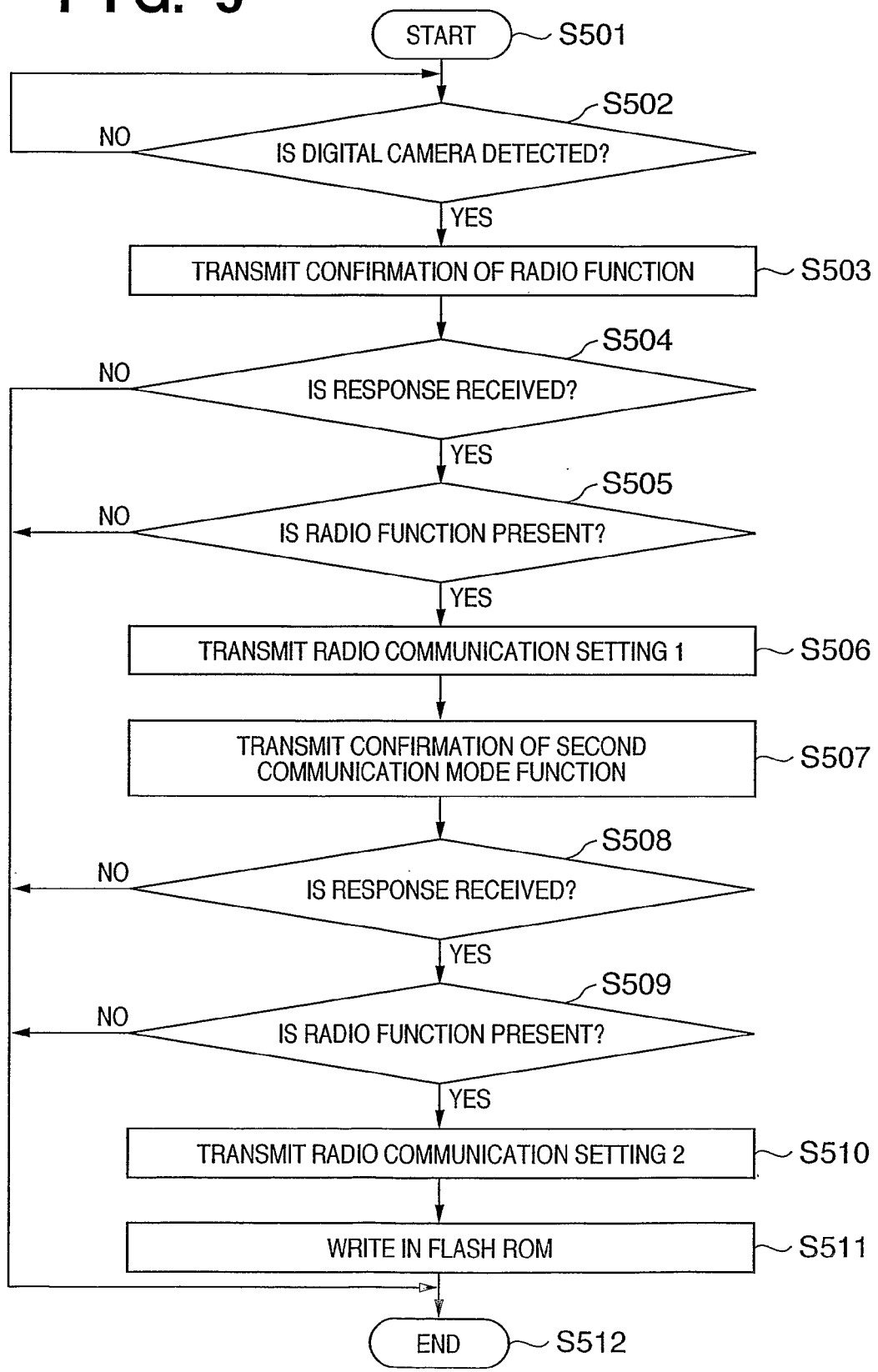

FIG. 6

| REGISTRATION NUMBER | DEVICE SPECIFIC ID OF CONNECTION DESTINATION | FIRST RADIO COMMUNICATION SETTING | PRESENCE/ ABSENCE OF SECOND RADIO COMMUNICATION SETTING | SECOND RADIO COMMUNICATION SETTING |
|---|---|---|---|---|
| 1 DEFAULT PRINTER | 0×D158492C | COMMUNICATION MODE : INFRASTRUCTURE<br>Ch : 11<br>ESS-ID : "office"<br>WEP-KEY : "sesame" | PRESENT | COMMUNICATION MODE : Ad-Hoc<br>Ch : 5<br>ESS-ID : "PRINT00A0B034"<br>WEP-KEY : "3epio%98#PH3" |
| 2 | 0×D1583A25 | COMMUNICATION MODE : INFRASTRUCTURE<br>Ch : 11<br>ESS-ID : "office"<br>WEP-KEY : "sesame" | PRESENT | COMMUNICATION MODE : Ad-Hoc<br>Ch : 3<br>ESS-ID : "PRINT00A0518C"<br>WEP-KEY : "PkHD!#Uc090$" |
| 3 | 0×A0C10023 | COMMUNICATION MODE : INFRASTRUCTURE<br>Ch : 14<br>ESS-ID : "home"<br>WEP-KEY : NONE | PRESENT | COMMUNICATION MODE : Ad-Hoc<br>Ch : 3<br>ESS-ID : "PRINT00603F26"<br>WEP-KEY : "5$+LkoiP8g02" |
| ⋮ | ⋮ | | | ⋮ |

FIG. 7

| REGISTRATION NUMBER | DEVICE SPECIFIC ID OF CONNECTION DESTINATION | FIRST RADIO COMMUNICATION SETTING | PRESENCE/ ABSENCE OF SECOND RADIO COMMUNICATION SETTING | SECOND RADIO COMMUNICATION SETTING |
|---|---|---|---|---|
| 1 | 0×D158C245 | COMMUNICATION MODE : INFRASTRUCTURE<br>Ch : 11<br>ESS-ID : "office"<br>WEP-KEY : "sesame" | PRESENT | COMMUNICATION MODE : Ad-Hoc<br>Ch : 5<br>ESS-ID : "PRINT00A0B034"<br>WEP-KEY : "3epio%98#PH3" |
| 2 | 0×D158C230 | | PRESENT | COMMUNICATION MODE : Ad-Hoc<br>Ch : 5<br>ESS-ID : "PRINT00A0B034"<br>WEP-KEY : "Dq9&oiH+e@EG" |
| 3 | 0×80D50938 | | PRESENT | COMMUNICATION MODE : Ad-Hoc<br>Ch : 5<br>ESS-ID : "PRINT00A0B034"<br>WEP-KEY : "Lg83%tUakw64" |
| : | : | : | : | : |

RADIO COMMUNICATION APPARATUS AND CONTROL METHOD THEREOF

TECHNICAL FIELD

The present invention relates to a technique of setting radio communication between devices having a radio communication function.

BACKGROUND ART

Recently, a standard by which various devices can be used at once only by connecting them by wires (cables) and products having this standard installed are put into practical use. For example, PictBridge (CIPA DC-001) by which printing can be performed by connecting a digital camera and printer by a cable called a USB (Universal Serial Bus) is standardized.

When a digital camera and printer using this standard are used, the printer becomes capable of printing when connected by the USB, and printing can be performed only by designating an image to be printed by using the user interface of the digital camera (the digital camera has a liquid crystal display for checking sensed images and the like and various keys).

On the other hand, demands for changing wired information transmission into radio information transmission by using a radio communication method based on the International Standard IEEE 802.11 are increasing, and radio communication is beginning to be used in communication between peripheral devices such as a digital camera, storage device, and printer. Radio communication requires no cable installation, and thereby increases the degree of freedom of the setting location of each device and improves the portability.

A predetermined communication mode, a predetermined ID (ESS-ID), and a predetermined channel for designating a frequency band are set in this radio communication apparatus. Communication is established in a communication network by matching the settings of another apparatus, i.e., a client apparatus in the communication network with these settings such as the communication mode. Note that the communication modes include the "Ad-Hoc mode (peer to peer)" by which a communication network is constructed only by devices having radio LAN cards installed, and the "infrastructure mode" which connects to the existing network via an access point of a repeater in a communication network.

In a network using the same ESS-ID, encrypted communication using a WEP key is performed. The WEP key is key information for encrypting or decrypting data to be transmitted or received. Since data can be exchanged only between radio communication apparatuses in which the same WEP key is set, a leak of the contents of communication to a radio communication apparatus which does not know the WEP key can be prevented. The technique as explained above is disclosed in Japanese Patent Laid-Open No. 2004-202779.

Even when the WEP key described above is used, however, a radio communication apparatus in the same radio network can intercept the contents of communication.

That is, as shown in FIG. 3, assume a radio LAN including access point AP1 (31) and radio communication terminals ST1 (32), ST2 (33), ST3 (34), and ST4 (35). In this radio LAN, radio communication between the individual radio communication terminals is performed in a mode in which radio communication is performed via access point AP1, i.e., in the infrastructure mode. Also, this radio LAN uses the same communication channel, the same ESS-ID, and the same WEP key. If data is exchanged by radio communication between radio communication terminals ST1 and ST2, for example, radio communication terminal ST3 using the same ESS-ID and the same WEP key can intercept the contents of this radio communication.

Generally, a configuration like this is presumably used when a radio LAN is installed in an office. However, even when private data exchange is to be performed between two radio communication terminals, e.g., even when printing is to be performed from a digital camera to a printer by radio communication, it is necessary to connect to the radio LAN by using a predetermined ESS-ID and a predetermined WEP key.

In addition, when a radio communication terminal connects to a radio LAN installed in an office, this radio communication terminal must receive broadcast packets steadily transmitted from another radio communication apparatus, and correctly return packets if necessary. If many radio communication terminals exist or a radio communication terminal which transmits a large amount of packets exists in a radio communication network, communication between these radio communication apparatuses may interfere with data transmitting and receiving operations.

DISCLOSURE OF INVENTION

The present invention has been made in consideration of the above situation, and has as its object to, for instance, enable to prevent easy interception of the contents of communication from another radio communication apparatus on a radio network.

According to the present invention, the foregoing object is attained by providing a radio communication apparatus comprising:

a radio communication setting storage unit that stores a first radio communication setting for performing radio communication on a first radio network, and a second radio communication setting for performing radio communication on a second radio network which is different from the first radio network;

a radio communication unit that performs radio communication using one of the first and second radio communication settings; and a radio communication setting switching unit that requests another radio communication apparatus in the first radio network to switch the first radio communication setting to the second radio communication setting in order to join the second radio network.

According to the present invention, the foregoing object is also attained by providing a control method of a radio communication apparatus that has a first radio communication setting for performing radio communication on a first radio network, and a second radio communication setting for performing radio communication on a second radio network which is different from the first radio network, and performs radio communication with another radio communication apparatus using one of the first and second radio communication settings, comprising:

requesting another radio communication apparatus in the first radio network to switch the first radio communication setting to the second radio communication setting in order to join the second radio network.

According to the present invention, the foregoing object is also attained by providing a radio communication apparatus comprising:

a radio communication setting storage unit that stores a first radio communication setting for performing radio communication on a first radio network, and a second radio communication setting for performing radio communication on a second radio network which is different from the first radio network;

a radio communication unit that performs radio communication using one of the first and second radio communication settings; and a radio communication setting switching unit that switches the first radio communication setting to the second radio communication setting in accordance with a radio communication setting switching request if the radio communication setting switching request is received from another radio communication apparatus in the first radio network.

According to the present invention, the foregoing object is also attained by providing a control method of a radio communication apparatus that has a first radio communication setting for performing radio communication on a first radio network, and a second radio communication setting for performing radio communication on a second radio network which is different from the first radio network, and performs radio communication using one of the first and second radio communication settings, comprising switching the first radio communication setting to the second radio communication setting in accordance with a radio communication setting switching request if the radio communication setting switching request is received from another radio communication apparatus in the first radio network.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 5 is a flowchart showing a determination sequence of a second radio communication setting which performed by a printer according to the first embodiment;

FIG. 6 is a view showing radio communication setting tables of the digital camera according to the first embodiment of the present invention;

FIG. 7 is a view showing radio communication setting table of the printer according to the first embodiment of the present invention;

BEST MODE FOR CARRYING OUT THE INVENTION

Preferred embodiments of the present invention will now be described in detail in accordance with the accompanying drawings.

First Embodiment

Figure 2A:
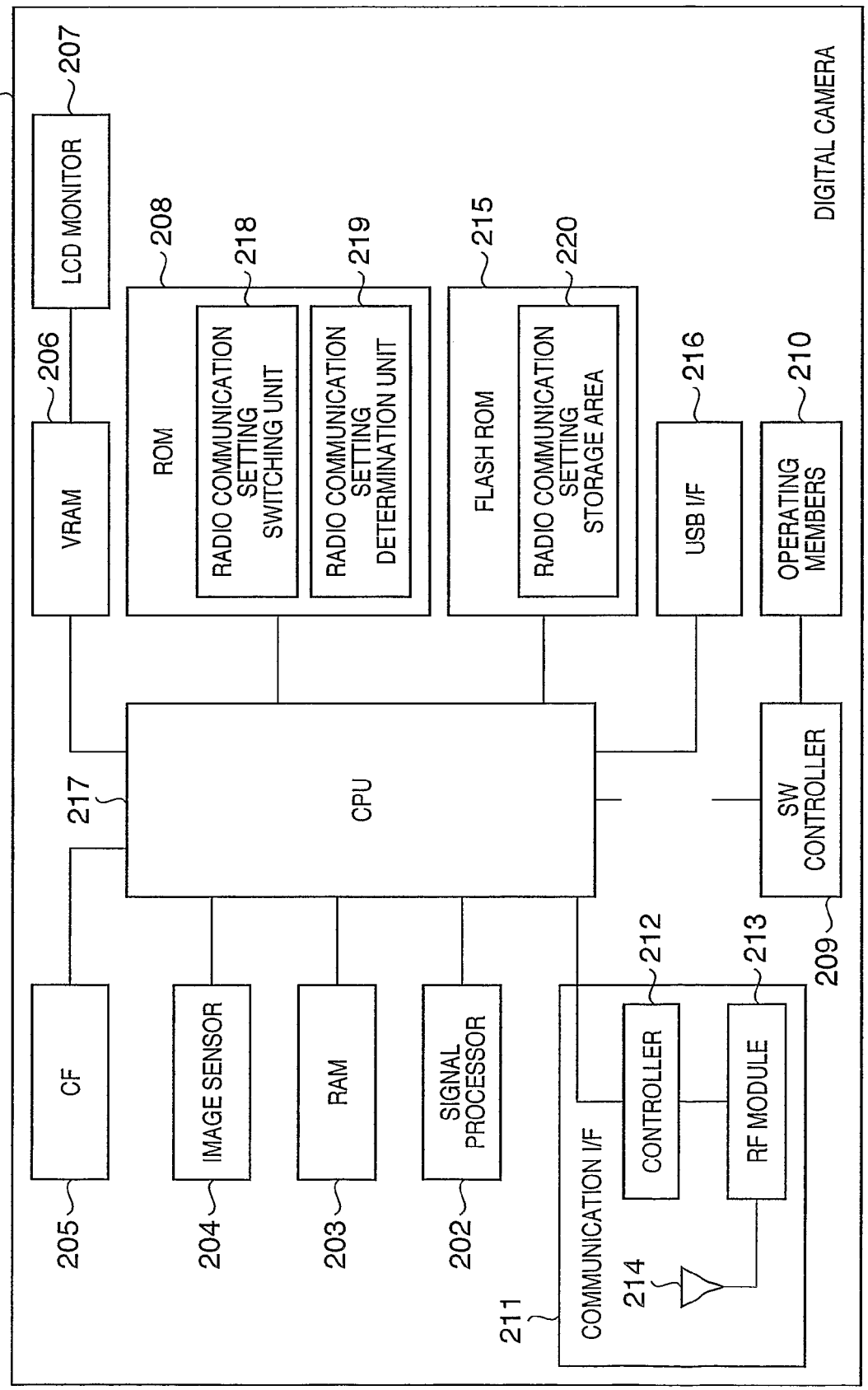
FIGS. 2A and 2B are block diagrams showing the arrangement of a digital camera and the arrangement of a printer according to first and second embodiments of the present invention.
Figure 2B:
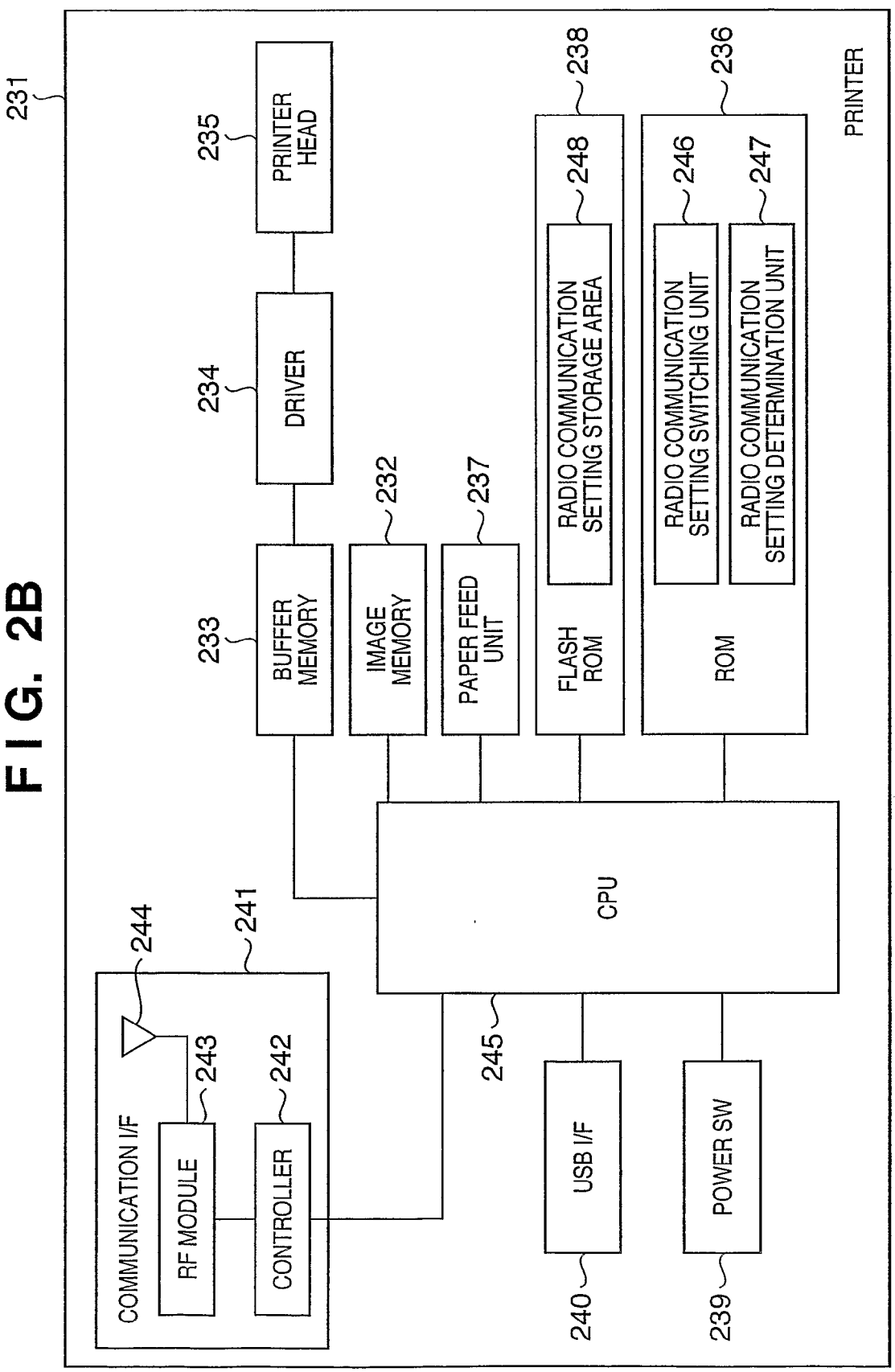

FIGS. 2A and 2B are diagrams showing a configuration of a print system according to the first embodiment of the present invention. The print system of this embodiment includes a digital camera 201, and a printer 231 connected to the digital camera 201 via a radio communicating means.

The digital camera 201 and printer 231 according to this embodiment include an interface for performing radio communication. This embodiment uses the IEEE 802.11b system as this radio interface.

The IEEE 802.11b system has two communication modes: the "Ad-Hoc mode" in which a network is constructed only by devices having radio LAN adaptors attached, and the "infrastructure mode" in which a device connects to the existing network via an access point of a repeater in a communication network. Radio LAN devices in the Ad-Hoc mode or a radio LAN device and an access point in the infrastructure mode attempt to establish connection by using an ESS-ID (Extended Service Set ID).

Also, when the IEEE 802.11b system is used, cryptographic communication using a WEP key is performed in a network using the same ESS-ID. The WEP key is key information for encrypting or decrypting data to be transmitted or received. Since data can be exchanged only between radio communication apparatuses in which the same WEP key is set, a leak of the contents of communication to a radio communication apparatus which does not know the WEP key can be prevented.

The individual arrangements shown in FIGS. 2A and 2B will be described in detail below. First, the digital camera 201 has an image sensor 204 which includes an image sensing lens, a CCD which receives an object light incident through the image sensing lens, and generates an image signal by photoelectrically converting the received light, and an analog/digital (A/D) conversion circuit. Under the control of a CPU 217, a digital image signal is output from the image sensor 204, processed by a signal processor 202, and temporarily held in a RAM 203. After that, the digital image signal formed is finally stored as an image file in a recording medium such as a compact flash (registered trademark) 205.

The CPU 17 is also connected to a ROM 208, a switch (SW) controller 209 which controls inputs from operating members 210, a VRAM 206 which holds display data of digital image signals and display data of various user interfaces, a radio communication interface 211, a USB interface 216 as a communication interface complying with the USB standard, and a flash ROM 215 which holds various parameters and various pieces of information. An LCD monitor 207 displays the contents of the display data held in the VRAM 206.

The operating members 210 include a power switch (not shown) for controlling ON/OFF of the power supply, a release switch (not shown) for designating image sensing, a switch (not shown) for instructing the LCD monitor 207 to display digital image signals, a switch (not shown) for displaying menus on the LCD monitor 207, a switch (not shown) used to move image frames forward or backward or to change the selected state in a menu, and a touch panel (not shown) which directly gives instructions on the liquid crystal.

This digital camera 201 has at least a power OFF mode, recording mode, playback mode, and print mode as operation modes, and these modes can be switched by designations from the operating members 210.

Figure 3:
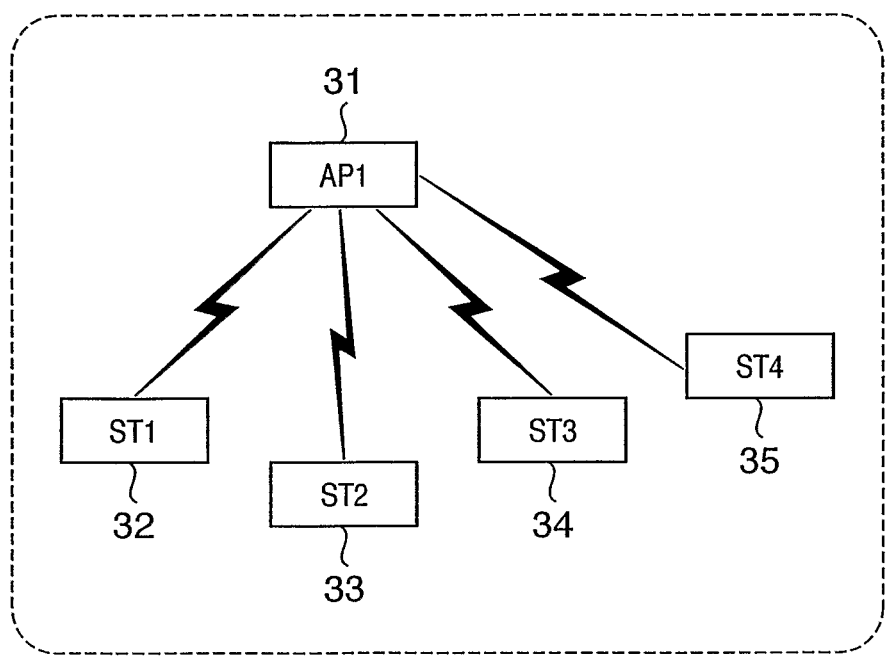
FIG. 3 is a view showing an example of a radio network using the first radio communication setting.

To participate in a radio network as shown in FIG. 3, the digital camera 201 of this embodiment attempts to connect to the network by using a predetermined first ESS-ID and a predetermined first WEP key.

Also, the digital camera 201 of this embodiment can construct a peer-to-peer connection relationship with the printer 231 by using a radio communicating means, and holds a second ESS-ID and second WEP key for this purpose.

The flash ROM 215 of this embodiment has a radio communication setting storage area 220 for holding the first and second ESS-IDs and first and second WEP keys. This area also holds information about, e.g., the communication modes such as the Ad-Hoc mode and infrastructure mode, and communication channels to be used.

The ROM 208 of this embodiment holds a radio communication setting determination unit 219 and radio communication setting switching unit 218 as software programs. The radio communication setting determination unit 219 determines the setting including the second ESS-ID and second WEP key by negotiation when the digital camera 201 connects to the printer 231 by the USB. The radio communication setting switching unit 218 switches radio networks to be connected by changing the ESS-ID and WEP key.

The radio communication interface 211 has a controller 212, RF module 213, and antenna 214. The controller 212 is a controller which performs, e.g., baseband control (radio interface control) for performing radio communication corresponding to the protocol of the IEEE 802.11b, and exchanges data with the CPU 217. The controller 212 also judges the reception level of a signal (the field strength of a signal).

The RF module 213 is a module which performs, e.g., A/D conversion and D/A conversion of signals in order to communicate data by radio, and connects to the antenna 214.

The antenna 214 radiates, as a radio wave, a signal converted into an analog signal by the RF module 213. The antenna 214 also receives an analog signal and supplies the signal to the RF module 213.

On the other hand, the printer 231 has a radio communication interface 241 which is the same as the radio communication interface 211 of the digital camera 201, and includes a controller 242, RF module 244, and antenna 243 like the digital camera 201.

The radio communication interface 241 is connected to a CPU 245 of the printer 231. This CPU 245 is also connected to an image memory 232, a ROM 236 holding programs and the like of the printer 231, a paper feed unit 237, a USB interface 240 as a communication interface complying with the USB standard, and a flash ROM 238 for holding various parameters and various pieces of information. The CPU 245 is further connected to a buffer memory 233 which is connected to a printer head 235 via a driver 234.

Image data as an object of printing transmitted from the digital camera 201 is temporarily held in the image memory 232 via the radio communication interface 241. When the printer 231 receives an instruction to print out the image data transmitted from the digital camera 201, the CPU 245 drives the paper feed unit 237 to feed a sheet of paper, and sets the sheet in a printing start position. At the same time, the CPU 245 expands the temporarily held image data to generate print data of one line, transfers the data to the buffer memory 233, and controls the printer head 235 via the driver 234, thereby starting printing. The printer head 235 can print data of one line at once. The paper feed unit 237 feeds a sheet by one line whenever printing of one line is completed.

As described above, the CPU 245 drives the paper feed unit 237 in synchronism with the transfer of the print data to the printer head 235. After thus printing the desired image, the CPU 245 drives the paper feed unit 237 to discharge the sheet. A power SW 239 for designating ON/OFF of the power supply is also connected to the CPU 245. When the user turns on this power SW, the power supply of the printer 231 is turned on.

To participate in the radio network as shown in FIG. 3, the printer 231 of this embodiment attempts, like the digital camera 201, to connect to the network by using a predetermined first ESS-ID and a predetermined first WEP key.

Also, the printer 231 of this embodiment can construct a peer-to-peer connection relationship with the digital camera 201 by using a radio communicating means, and holds a second ESS-ID and second WEP key for this purpose.

The flash ROM 238 of this embodiment has a radio communication setting storage area 248 for holding the first and second ESS-IDs and first and second WEP keys. This area also holds information about, e.g., the communication modes such as the Ad-Hoc mode and infrastructure mode, and communication channels to be used.

The ROM 236 of this embodiment holds a radio communication setting determination unit 247 and radio communication setting switching unit 246 as software programs. The radio communication setting determination unit 247 determines the second settings including the second ESS-ID and second WEP key by negotiation when the printer 231 connects to the digital camera 201 by the USB. The radio communication setting switching unit 246 switches radio networks to be connected by changing the ESS-ID and WEP key.

A determination sequence of a second radio communication setting which performed by the digital camera 201 according to the first embodiment will be explained below with reference to FIG. 4. This processing is implemented by exchanging data with the printer 231 via a USB cable.

Figure 4:
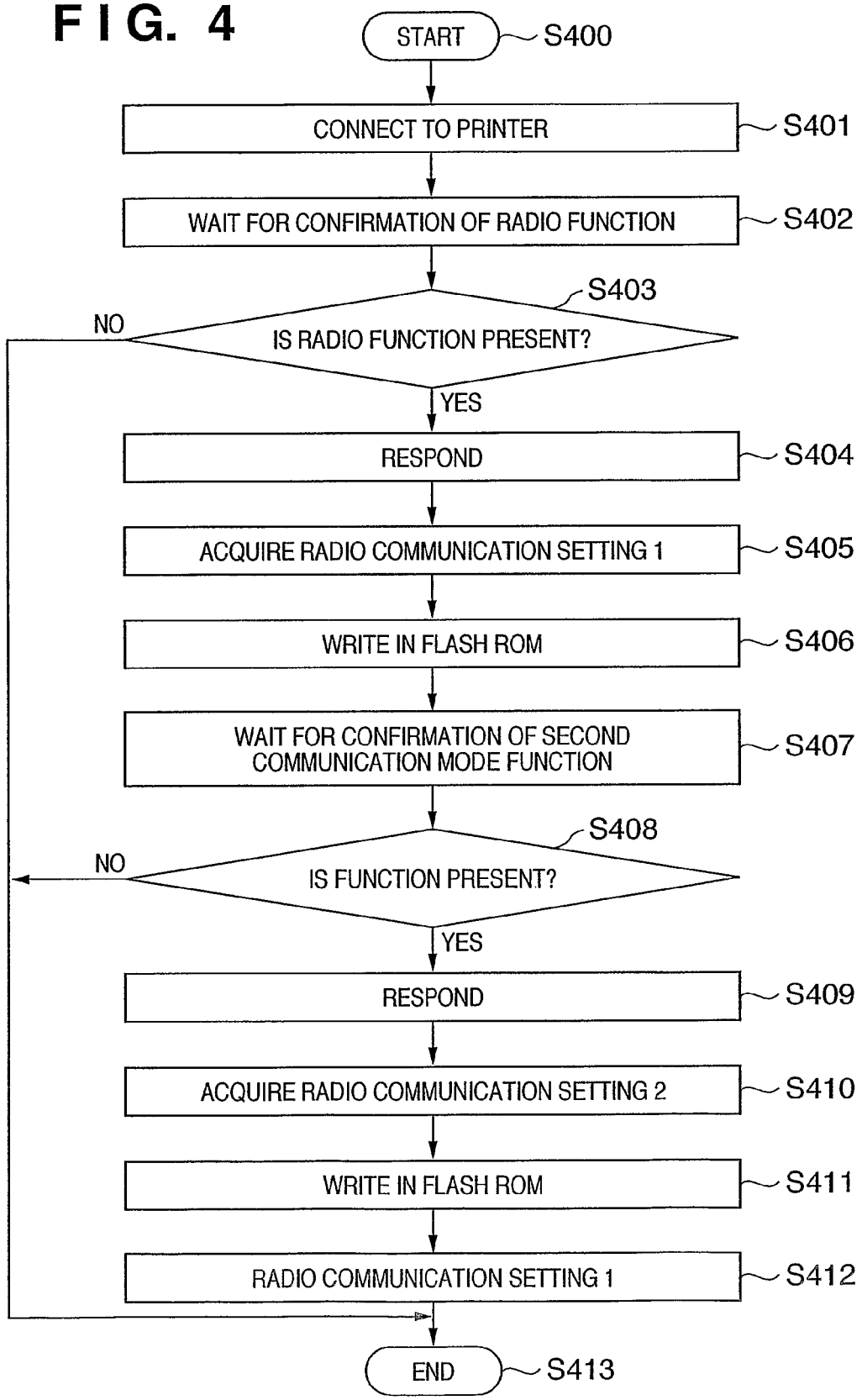
FIG. 4 is a flowchart showing a determination sequence of a second radio communication setting which performed by the digital camera according to the first embodiment.

Referring to FIG. 4, when the digital camera 201 is connected to the printer 231 by a USB cable (step S401), it waits for the reception of a request which inquires the presence/absence of a radio communication function (step S402).

When receiving this request, the digital camera 201 determines whether the radio communication function is present (step S403). If this function is present, the digital camera 201 transmits a response containing information indicating the presence of the radio communication function (step S404).

In step S404, the digital camera 201 transmits its device specific ID at the same time. The device specific ID is an ID which is so assigned as to be unique to each radio communication device, and is formed by combining, e.g., an ID for identifying the vender, an ID for identifying the product, and the serial number of the product. It is also possible to use a MAC address assigned to a radio communication I/F.

After that, the digital camera 201 acquires first radio communication setting containing the first ESS-ID and first WEP key information from the printer 231 (step S405), and registers the acquired first radio communication setting in the flash ROM 215.

Then, the digital camera 201 waits for the reception of a request which inquires whether a peer-to-peer radio communication function (a second radio communication mode) using second radio communication setting which is inaccessible from radio communication using first radio communication setting is present (step S407).

When receiving this request, the digital camera 201 determines whether the second radio communication mode is present (step S408). If this mode is present, the digital camera 201 transmits a response containing information indicating the presence of the second radio communication mode (step S409).

After that, the digital camera 201 acquires the second radio communication setting containing the second ESS-ID and second WEP key information from the printer 231 (step S410), and registers the acquired second radio communication setting in the flash ROM 215 (step S411).

Finally, the digital camera 201 performs initial setting in accordance with the first radio communication setting registered in the flash ROM 215 (step S412). In this manner, the digital camera 201 can execute radio communication by using the designated communication mode (Ad-Hoc mode or infrastructure mode), ESS-ID, and WEP key.

A determination sequence of a second radio communication setting which performed by the printer 231 according to the first embodiment will be explained below with reference to FIG. 5. This processing is implemented by exchanging data with the digital camera 201 via a USB cable.

Referring to FIG. 5, the printer 231 first detects that the digital camera 201 is connected to the printer 231 via a USB cable (step S502). After that, the printer 231 transmits a request command for determining whether the digital camera 201 has a radio communicating means, to the digital camera 201 via the USB interface 240 (step S503).

This request command is, for example, to make the digital camera 201 execute a process for determining whether the flash ROM 215 or ROM 208 of the digital camera 201 holds predetermined information (information indicating the presence of the radio communication function).

Then, the printer 231 waits for the reception of a response from the digital camera 201 for a predetermined time (step S504). If no response is received even when the predetermined time has elapsed, the printer 231 determines that the connected device (the digital camera 201) does not support at least a radio direct printing function, and terminates the processing at once. If a response is received, the printer 231 determines by checking the contents of the response whether the connected device (the digital camera 201) has the radio communication function (step S505).

If the printer 231 determines that the connected device has the radio communication function, it transmits the first radio communication setting containing the first ESS-ID and first WEP key information to the digital camera 201 (step S506). At the same time, the printer 231 transmits its device specific ID in step S506.

If the printer 231 does not belong to the radio network as shown in FIG. 3, initial values uniquely assigned to each product upon shipment from the factory are applied as the first ESS-ID and first WEP key information. If the printer 231 belongs to the radio network as shown in FIG. 3, the ESS-ID and WEP key used in the radio network are used.

After that, the printer 231 transmits to the digital camera 201 a request command for requesting to determine whether the digital camera 201 has the peer-to-peer radio communication function (the second radio communication mode) using the second radio communication setting which is inaccessible via radio communication using the first radio communication setting (step S507). The printer 231 waits for the reception of a response from the digital camera 201 for a predetermined time (step S508). If no response is received even when the predetermined time has elapsed, the printer 231 determines that the connected device (the digital camera 201) does not support the second radio communication mode, and terminates the processing at once. If a response is received, the printer 231 determines by checking the contents of the response whether the connected device (the digital camera 201) supports the second radio communication mode (step S509).

If the printer 231 determines that the connected device supports the second radio communication mode, it transmits the second radio communication setting containing the second ESS-ID and second WEP key information to the digital camera 201 (step S510). The second ESS-ID and second WEP key information are generated by the printer 231. In this embodiment, the second ESS-ID is generated by combining a fixed character string (e.g., "PRINT") of the printer 231 and a portion of the MAC address of the printer 231. The second WEP key is generated by using a random number of the like so that the key is not easily estimated from any other radio terminal. After that, the second radio communication setting is registered in the flash ROM 238 (step S511).

FIG. 6 shows a radio communication setting table held in the flash ROM 215 of the digital camera 201 according to this embodiment. As shown in FIG. 6, the radio communication setting table is made up of, e.g., the device specific ID of each registered device, the first radio communication setting, the presence/absence of the second radio communication setting, and the second radio communication setting. The first radio communication setting includes setting values, such as a communication mode, the first ESS ID, and the first WEP key. Further, the second radio communication setting includes setting values, such as a communication mode, the second ESS ID, and the second WEP key.

FIG. 7 shows a radio communication setting table held in the flash ROM 238 of the printer 231 according to this embodiment. As in the digital camera 201 shown in FIG. 6, the radio communication setting table is made up of, e.g., the device specific ID of each registered device, the first radio communication setting, the presence/absence of the second radio communication setting, and the second radio communication setting. It should be noted that the printer 231 uses the same first radio communication setting for all registered devices.

A sequence of switching radio communication by the first radio communication setting to radio communication by the second radio communication setting, and a sequence of restoring radio communication by the first radio communication setting, performed by the digital camera 201 according to the first embodiment, will be described below with reference to FIG. 1.

Figure 1:
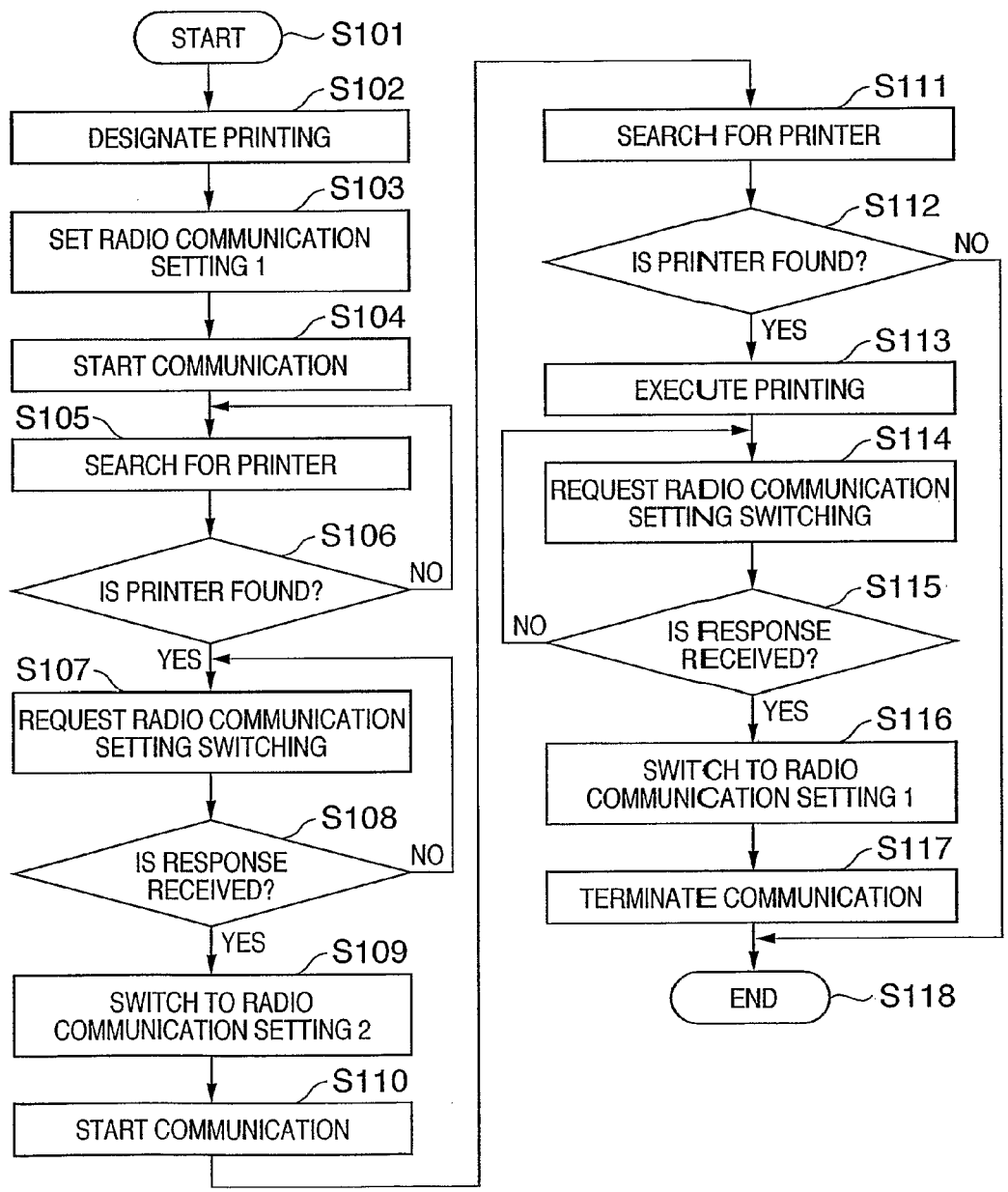
FIG. 1 is a flowchart showing a radio communication setting switching operation of a digital camera according to the first embodiment.

A flowchart shown in FIG. 1 shows a sequence by which the user operates the digital camera 201 to transmit an image file in the compact flash (registered trademark) 205 to the printer 231, and execute printing.

Referring to FIG. 1, when receiving a designation of printing from the user (step S102), the digital camera 201 first performs radio communication setting in accordance with the first radio communication setting registered in the flash ROM 215 (step S103). If a plurality of first radio communication settings are held in the flash ROM 215 of the digital camera 201, the digital camera 201 uses first radio communication setting corresponding to a printer 231 registered as a default printer.

For example, if the device specific ID of a printer 231 is "0xD158492C", the digital camera 201 uses a value "office" as the first ESS-ID and a value "sesame" as the first WEP key in accordance with FIG. 6.

Then, the digital camera 201 starts radio communication (step S104), and searches for the printer 231 (step S105). The printer 231 can be found by inquiring of all devices existing on the radio network about their device specific IDs, and comparing the device specific ID contained in each response with the device specific ID of the printer 231 registered beforehand by the flow shown in FIG. 4.

If the printer 231 is found (step S106), the digital camera 201 transmits a request to the printer 231 to switch the radio communication from the first radio communication setting to the second radio communication setting (step S107). At the same time, the digital camera 201 transmits its device specific ID.

The digital camera 201 then waits for the reception of a response from the printer 231 for a predetermined time (step S108). If no response is received even when the predetermined time has elapsed, the digital camera 201 retransmits the radio communication setting switching request in step S107. This trial is performed a predetermined number of times. If no response is received even after these trials, the digital camera 201 determines that the printer 231 is unable to execute printing because, e.g., it is in a busy state, and notifies the user of this information.

If a response is received, the digital camera 201 switches its radio communication setting from the first radio communication setting to the second radio communication setting (step S109). The Ad-Hoc mode is used in radio communication by the second radio communication setting. After that, the digital camera 201 restarts connection by radio communication (step S110).

As the second radio communication setting, if the device specific ID of the printer 231 is "0xD158492C", for example, the digital camera 201 uses a value "PRINT00A0B034" as the second ESS-ID and a value "3epio%98#PH3" as the second WEP key in accordance with FIG. 6.

After that, the digital camera 201 searches for the printer 231 again (step S111). The printer 231 can be found by the same method as described in step S105.

If the printer 231 is not found (step S112), the digital camera 201 determines that some problem arises in the printer 231, and terminates the processing. If the printer 231 is found, the digital camera 201 executes a series of direct printing processes, i.e., transmits an image file designated by the user to the printer 231, and requests execution of printing (step S113).

After that, the digital camera 201 transmits a request to the printer 231 to switch the radio communication settings from the second radio communication setting to the first radio communication setting (step S114).

The digital camera 102 then waits for the reception of a response from the printer 231 for a predetermined time (step S115). If no response is received even when the predetermined time has elapsed, the digital camera 201 retransmits the radio communication setting switching request in step S114. This trial is performed a predetermined number of times. If no response is received even after these trials, the digital camera 201 determines that the printer 231 is abnormally operating for some reason, and notifies the user of the information.

If a response is received, the digital camera 201 switches its radio communication settings from the second radio communication setting to the first radio communication setting (step S116), and terminates the processing of radio communication (S117).

A sequence of switching radio communication by the first radio communication setting to radio communication by the second radio communication setting, and a sequence of restoring radio communication by the first radio communication setting, performed by the printer 231 according to the first embodiment, will be described below with reference to FIG. 8.

Figure 8:
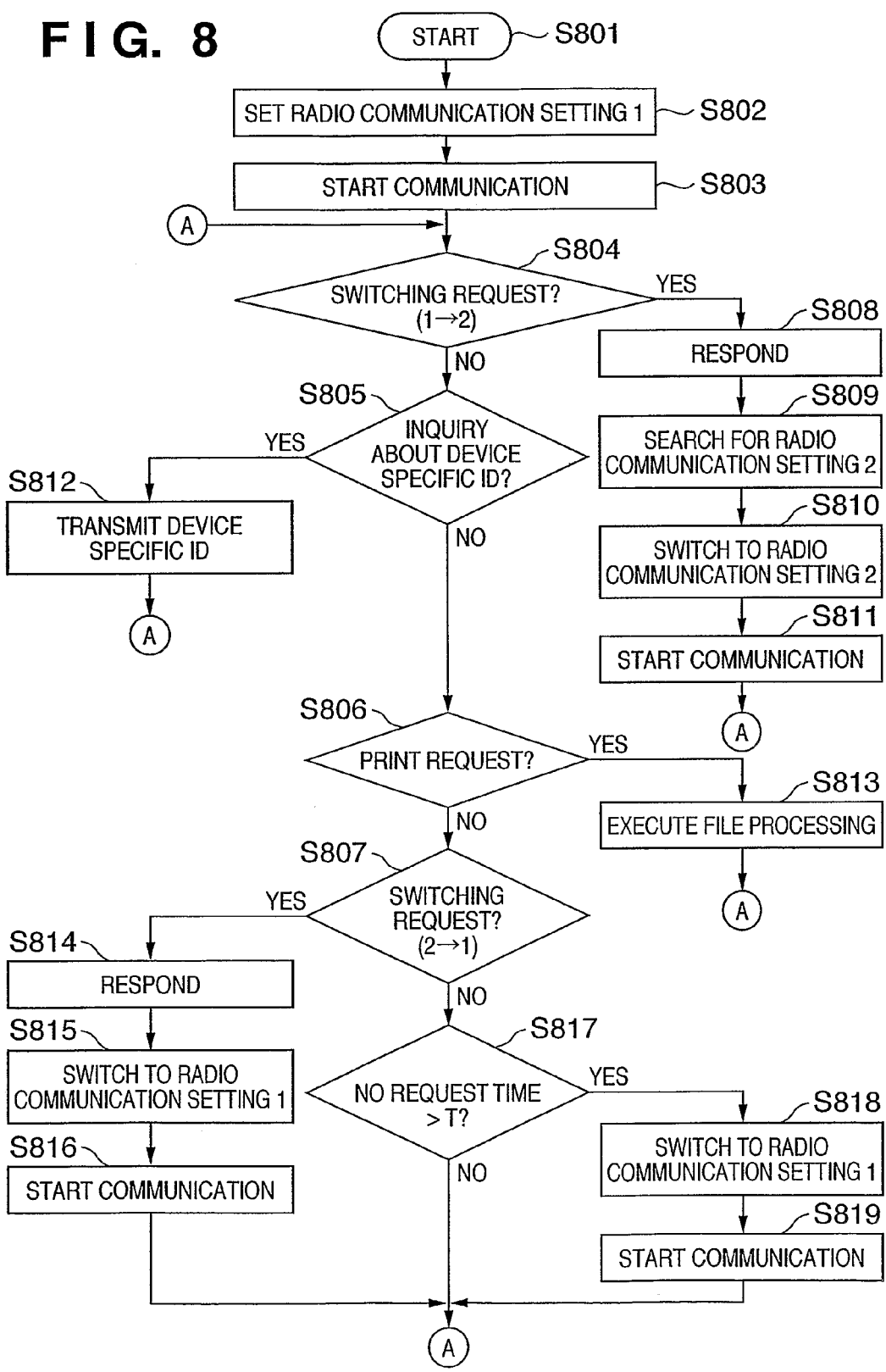
FIG. 8 is a flowchart showing a radio communication setting switching operation of the printer according to the first embodiment.

A flowchart shown in FIG. 8 shows a sequence by which the printer 231 in a radio communication state using the first radio communication setting executes printing in accordance with instructions from the digital camera 201.

Referring to FIG. 8, the printer 231 performs radio communication setting in accordance with the first radio communication setting registered in the flash ROM 238 (step S802). That is, the printer 231 uses a setting value "office" as the first ESS-ID and a setting value "sesame" as the first WEP key in accordance with FIG. 7.

Then, the printer 231 starts radio communication (step S803), and executes at least one of a process of determining, whether a request for switching the radio communication settings (from the first radio communication setting to the second radio communication setting) is received from another radio device (step S804), a process of determining whether an inquiry about the device specific ID is received from the digital camera 201 (step S805), a process of determining whether a printing request is received from the digital camera 201 (step S806), a process of determining whether a request for switching the radio communication settings (from the second radio communication setting to the first radio communication setting) is received from the digital camera 201 (step S807), and a process of determining whether a request from the digital camera 201 has not been generated for a predetermined time T or more while radio communication is performed using the second radio communication setting (step S817).

The digital camera 201 transmits instructions to the printer 231, as explained with reference to FIG. 1, the inquiry about the device specific ID of the printer 231 (step S105), the request for switching from the first radio communication setting to the second radio communication setting (step S109), the inquiry about the device specific ID of the printer 231 (step S111), the request for execution of printing (step S113), and the request for switching from the second radio communication setting to the first radio communication setting (step S116).

Operations of the printer 231 when these instructions are transmitted from the digital camera 201 will be explained below.

If in step S804 the printer 231 performs radio communication by the first radio communication setting and receives the radio communication setting switching request from the digital camera 201, the printer 231 transmits an accept response to this switching request (step S808). Simultaneously with the reception of the radio communication setting switching request in step S804, the printer 231 receives the device specific ID of the digital camera 201 from it.

The printer 231 then searches the radio communication setting table held in the flash ROM 238 for the second radio communication setting by using the received device specific ID as a search key (step S809). For example, if the device specific ID is "0xD158C245", "PRINT00A0B034" as the second ESS-ID and "3epio%98#PH3" as the second WEP key are obtained as search results in accordance with FIG. 7.

After that, the printer 231 switches to the second radio communication setting including these second ESS-ID and second WEP key (step S810). The Ad-Hoc mode is used in this radio communication by the second radio communication setting. After that, the printer 231 restarts radio communication (step S811).

On the other hand, if in step S805 the printer 231 receives the inquiry about the device specific ID from the digital camera 201, in step S812 the printer 231 transmits its device specific ID to the digital camera 201.

On the other hand, if in step S806 the printer 231 receives the request for printing from the digital camera 201, it receives an image file transmitted from the digital camera 201, and, in accordance with an image file printing execution request transmitted after that, forms print data by sequentially expanding image data formed from the image file, and executes printing (step S813).

On the other hand, if in step S807 the printer 231 performs radio communication by the second radio communication setting and receives the radio communication setting switching request from the digital camera 201, it transmits an accept response to this switching request (step S814).

After that, the printer 231 performs radio communication setting in accordance with the first radio communication setting registered in the flash ROM 238 (step S815), and restarts radio communication (step S816).

On the other hand, if no new request has been generated from the digital camera 201 for the predetermined time T or more, the printer 231 performs radio communication setting in accordance with the first radio communication setting registered in the flash ROM 238 (step S818), and restarts radio communication (step S819).

In this manner, even if the digital camera 201 stops radio communication during execution of printing because, e.g., the power supply is turned off, control can be so performed as to spontaneously switch to the first radio communication setting when the direct print process is completed, without explicitly exchanging data to restore radio communication by the first radio communication setting from radio communication by the second radio communication setting.

As described above, direct printing between the digital camera 201 and printer 231 is executed using radio communication by the second radio communication setting. Since the second WEP key is formed by using a random number or the like, it is difficult to intercept the contents of communication even from a radio terminal which performs radio communication by the first radio communication setting. Also, after the direct print process is completed, radio communication by the original first radio communication setting is restored.

The embodiment of the present invention is not limited to a radio communication system including the digital camera 201 and printer 231, but is also applicable to a radio communication system including arbitrary radio devices, e.g., a radio communication system including the digital camera 201 and storage device.

In the first embodiment, after the designation of printing is received from the user in step S102 of FIG. 8, in step S107 the digital camera 201 unconditionally requests the printer 231, which is found by radio communication by the first radio communication setting, to switch the radio communication settings.

If, however, a radio network in which a user can participate by the first radio communication setting is privately constructed by a certain person, this person alone knows the ESS-ID and WEP key, so interception by any third party is impossible. This obviates the need to execute printing by switching to the second radio communication setting.

In this case, a column of a flag indicating whether to switch to the second radio communication setting is formed in the radio communication setting table held in the flash ROM 215 of the digital camera 201. If this flag is ON, direct print process is executed by switching to the second radio communication setting as described in the first embodiment. If the flag is OFF, direct print process is executed on the radio network by using the first radio communication setting. Control like this is readily possible. Note that the flag is turned on or off by an operation by the user.

In this manner, it is possible to execute printing on a radio network using the first radio communication setting if the network is a privately constructed one, and execute printing by switching to the second radio communication setting if a plurality of users participate in a radio network using the first radio communication setting.

Also, as a modification of the first embodiment, assume that the digital camera 201 has a password setting function, and, if a password is set, a user who does not know the password cannot read an image file stored in the compact flash (registered trademark) 205 even by the use of the LCD monitor 207 of the digital camera 201. In this case, it is readily possible to perform control such that if the password is set, printing is executed by switching to the second radio communication setting as described in the first embodiment, and, if no password is set, printing is executed on a radio network using the first radio communication setting.

This makes it possible to execute printing by switching to the second radio communication setting if the secrecy of data to be exchanged by radio communication is presumably high, and execute printing on a radio network using the first radio communication setting if not.

Second Embodiment

In the first embodiment, a method of switching the first radio communication setting to the second radio communication setting in accordance with instructions from the digital camera 201 when the printer 231 participates in a radio network using the first radio communication setting is explained.

In the second embodiment, a method by which a printer 231 instructs a digital camera 201 to switch the first radio communication setting to the second radio communication setting will be explained. It should be noted that the second embodiment is a modification of the first embodiment. Therefore, the first embodiment is considered as a premise.

The arrangements of the digital camera 201 and printer 231 of this embodiment are the same as shown in FIGS. 2A, 2B and 3.

A sequence by which the digital camera 201 of the second embodiment determines second radio communication settings is the same as shown in FIG. 4.

A sequence by which the printer 231 of the second embodiment determines second radio communication settings is the same as shown in FIG. 5.

Also, a radio communication setting table held in a flash ROM 215 of the digital camera 201 of the second embodiment are the same as shown in FIG. 6. Likewise, a radio communication setting table held in a flash ROM 238 of the printer 231 of the second embodiment are the same as shown in FIG. 7.

A sequence of switching radio communication by the first radio communication setting to radio communication by the second radio communication setting, and a sequence of restoring radio communication by the first radio communication setting, performed by the printer 231 of the second embodiment, will be explained below with reference to FIG. 9.

Figure 9:
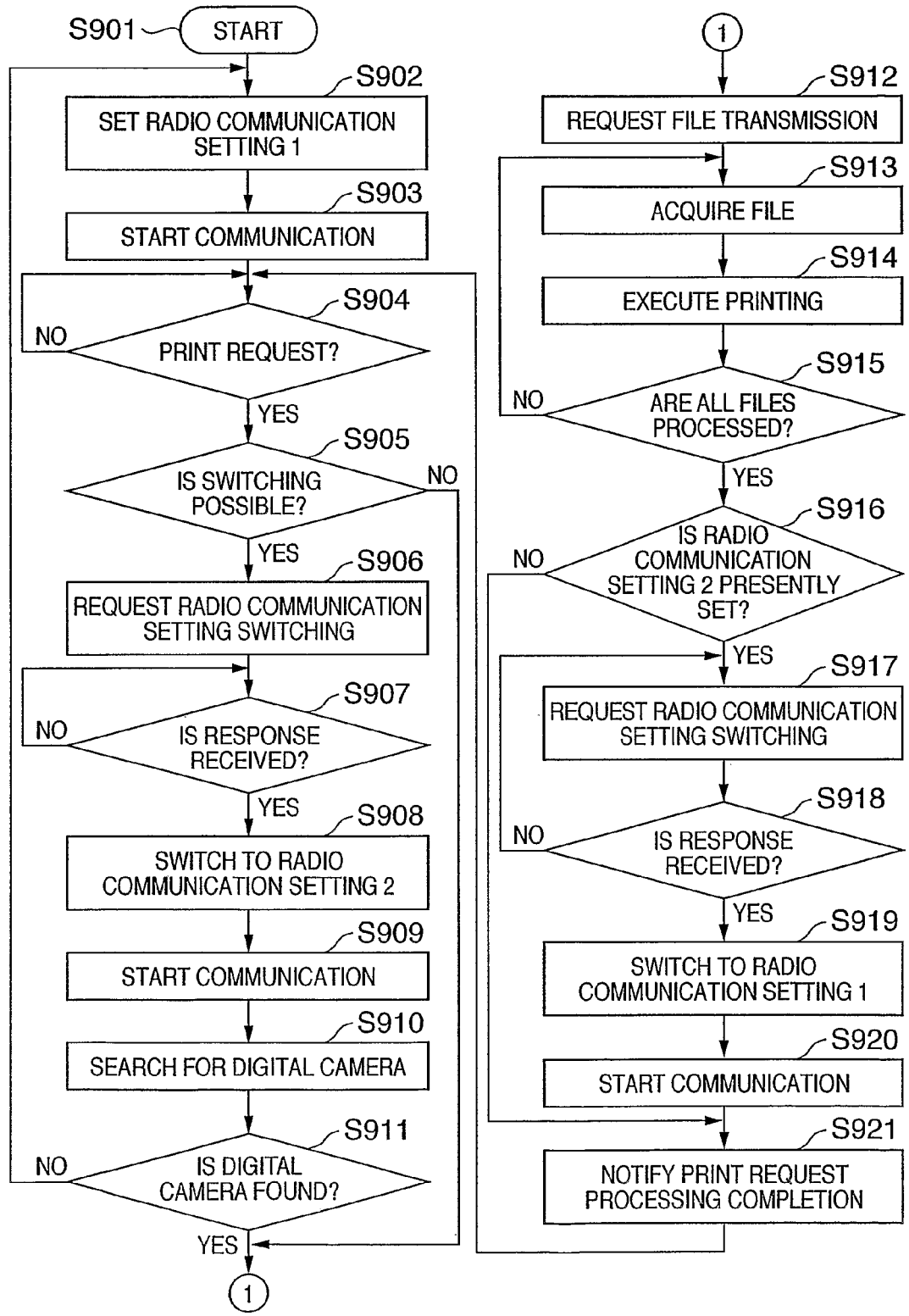
FIG. 9 is a flowchart showing a radio communication setting switching operation of a printer according to the second embodiment.

A flowchart shown in FIG. 9 shows a sequence by which the printer 231 in a radio communication state using the first radio communication setting executes printing in accordance with instructions from the digital camera 201.

Referring to FIG. 9, the printer 231 performs radio communication setting in accordance with the first radio communication setting registered in the flash ROM 238 (step S902), and starts radio communication (step S903).

That is, the printer 231 uses a set value "office" as the first ESS-ID and a set value "sesame" as the first WEP key in accordance with FIG. 7.

Then, the printer 231 determines whether a print request from the digital camera 201 is received (step S904). If a print request is transmitted from the digital camera 201, the printer 231 determines whether to switch the radio communication settings (step S905). For example, if the printer 231 may be used by another radio terminal on a radio network using the first radio communication setting, switching of the radio communication settings temporarily disables access from the other terminal. Depending on the degree of this inconvenience, the printer 231 may determine that an image file to be printed is to be transmitted and received without switching the radio communication settings. In addition, the printer 231 can receive a parameter indicating the secrecy of an image file simultaneously with the reception of the print request in step S904, and can determine whether to switch radio communications on the basis of the value of this parameter.

Also, simultaneously with the transmission of the print request received in step S904, the digital camera 201 transmits a device specific ID and an ID for identifying the image file to be printed. The printer 231 holds these values.

If in step S905 the printer 231 determines to switch the radio communication settings, it transmits a request to the digital camera 201 to switch the radio communication settings from the first radio communication setting to the second radio communication setting (step S906). At the same time, the printer 231 transmits its device specific ID.

The printer 231 then waits for the reception of a response from the digital camera 201 for a predetermined time (step S907). If no response is received even when the predetermined time has elapsed, the printer 231 retransmits the radio communication setting switching request in step S906. This trial is performed a predetermined number of times. If no response is received even after these trials, the printer 231 determines that the digital camera 201 is unable to execute radio communication by radio communication setting 2 because, e.g., it is in a busy state, and interrupts the process for printing.

If a response is received, the printer 231 switches its radio communication settings from the first radio communication setting to the second radio communication setting (step S908). The Ad-Hoc mode is used in radio communication by the second radio communication setting.

As the second radio communication setting, if the device specific ID of the digital camera 201 is "0xD158C245", for example, the printer 231 uses a value "PRINT00A0B034" as the second ESS-ID and a value "3epio%98#PH3" as the second WEP key in accordance with FIG. 7. After that, the printer 231 restarts connection by radio communication (step S909).

Then, the printer 231 searches for the digital camera 201 (step S910). The digital camera 201 can be found by inquiring of all devices existing on the radio network about their device specific IDs, and comparing the device specific ID contained in each response with the device specific ID of the digital camera 201 received in step S904.

If the digital camera 201 is not found (step S911), the printer 231 determines that some problem arises in the digital camera 201, and terminates the processing. If the digital camera 201 is found, the printer 231 transmits, to the digital camera 201, a request for transmission of the image file to be printed, by using the ID of the image file received in step S904 (step S912) as a key, acquires the transmitted image file (step S913), and executes printing by forming print data by sequentially expanding image data formed from the acquired image file (step S914). The printer 231 repeats steps S912 to S914 by the number of image files requested to be printed in step S904 (step S915).

After that, if radio communication is presently performed by the second radio communication setting (step S916), the printer 231 transmits a request to the digital camera 201 to switch the radio communication settings from the second radio communication setting to the first radio communication setting (step S917).

The printer 231 then waits for the reception of a response from the digital camera 201 for a predetermined time (step S918). If no response is received even when the predetermined time has elapsed, the printer 231 retransmits the radio communication setting switching request in step S917. This trial is performed a predetermined number of times. If no response is received even after these trials, the printer 231 determines that the digital camera 201 is abnormally operating for some reason, and advances to the next processing.

If a response is received, the printer 231 switches its radio communication settings from the second radio communication setting to the first radio communication setting (step S919), and starts radio communication (step S920).

After that, the printer 231 transmits a processing completion notification for the print request to the digital camera 201 (step S921), and returns to the process of waiting for the reception of a print request in step S904.

A sequence of switching radio communication by the first radio communication setting to radio communication by the second radio communication setting, and a sequence of restoring radio communication by the first radio communication setting, performed by the digital camera 201 of the second embodiment, will be described below with reference to FIG. 10.

Figure 10:
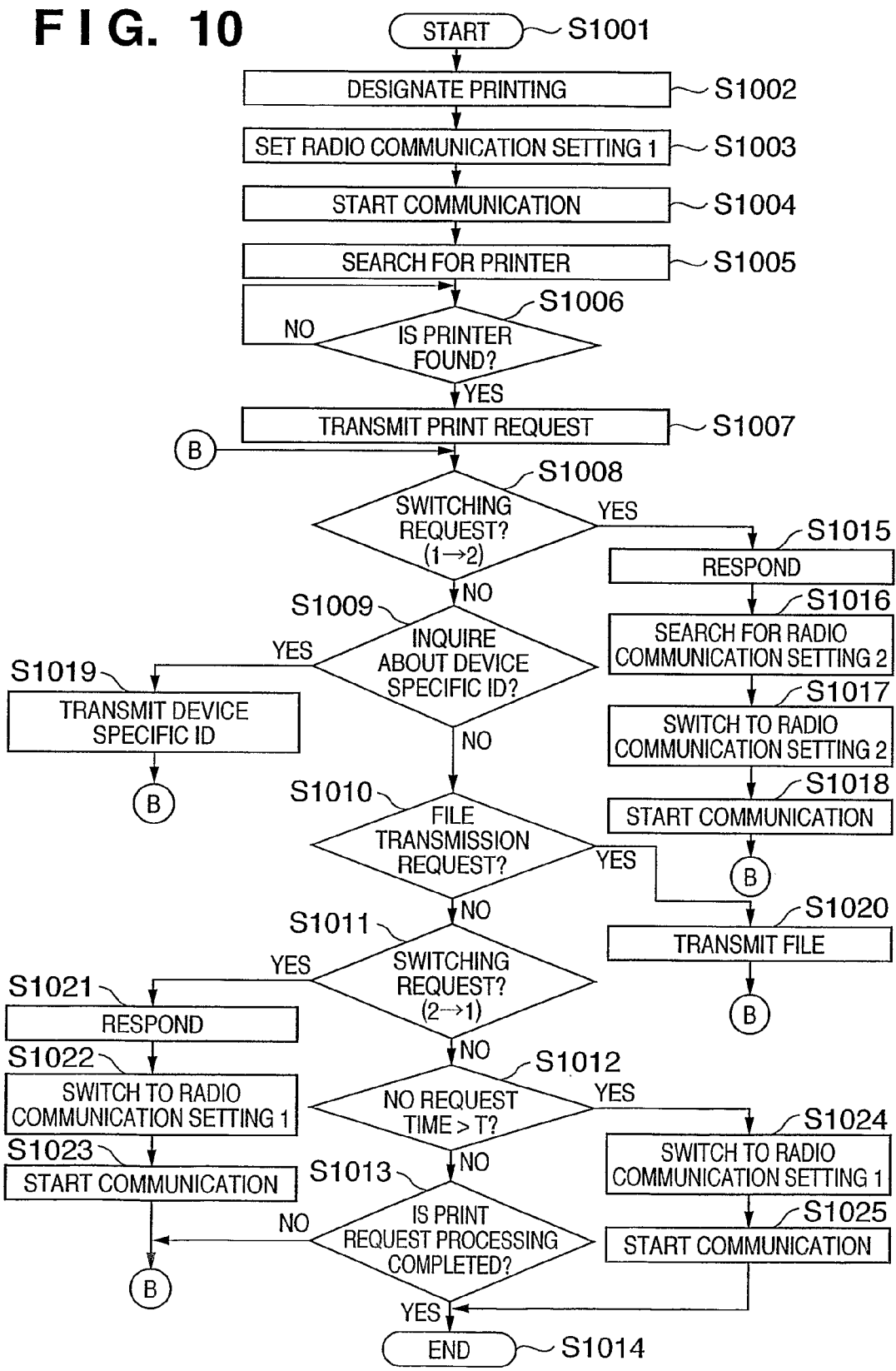
FIG. 10 is a flowchart showing a radio communication setting switching operation of a digital camera according to the second embodiment.

A flowchart shown in FIG. 10 shows a sequence by which the user operates the digital camera 201 to transmit an image file in a compact flash (registered trademark) 205 to the printer 231, and execute printing.

Referring to FIG. 10, when receiving a print request from the user (step S1002), the digital camera 201 first performs radio communication setting in accordance with the first radio communication setting registered in the flash ROM 215 (step S1003). If a plurality of pieces of first radio communication setting are held in the flash ROM 215 of the digital camera 201, first radio communication setting corresponding to a printer registered as a default printer is used.

For example, if the device specific ID of a printer 231 is "0xD158492C", the digital camera 201 uses a value "office" as the first ESS-ID and a value "sesame" as the first WEP key in accordance with FIG. 6.

Then, the digital camera 201 starts radio communication (step S1004), and searches for the printer 231 (step S1005). The printer 231 can be found by inquiring of all devices existing on the radio network about their device specific IDs, and comparing the device specific ID contained in each response with the device specific ID of the printer 231 registered beforehand by the flow shown in FIG. 4.

If the printer 231 is found (step S1006), the digital camera 201 transmits a print request to the printer 231 (step S1007). At the same time, the digital camera 201 transmits its device specific ID and an ID for identifying an image file to be printed. If necessary, a parameter indicating the secrecy of the image file may also be simultaneously transmitted.

After that, the digital camera 201 executes at least one of a process of determining whether a request for switching the radio communication settings (from the first radio communication setting to the second radio communication setting) is received from the printer 231 (step S1008), a process of determining whether an inquiry about the device specific ID is received from the printer 231 (step S1009), a process of determining whether a request for image file transmission is received from the printer 231 (step S1010), a process of determining whether a request for switching the radio communication settings (from the second radio communication setting to the first radio communication setting) is received from the printer 231 (step S1011), a process of determining whether a request from another radio device has not been generated for a predetermined time T or more while radio communication is performed using the second radio communication setting (step S1012), and a process of determining whether a processing completion notification for the print request is received from another radio device (step S1013).

When an image file is to be transmitted and received by using radio communication by the second radio communication setting, as explained with reference to FIG. 9, the printer 231 transmits instructions to the digital camera 201 the request for switching from the first radio communication setting to the second radio communication setting (step S906), the inquiry about the device specific ID of the digital camera 201 (step S910), the request for file acquisition (step S912), the request for switching from the second radio communication setting to the first radio communication setting (step S917), and the processing completion notification for the print request (step S921).

Operations of the digital camera 201 when these instructions are transmitted from the printer 231 will be explained below.

If in step S1008 the digital camera 201 performs radio communication by the first radio communication setting and receives the radio communication setting switching request from the printer 231, the digital camera 201 transmits an accept response to this switching request (step S1015). Simultaneously with the reception of the radio communication setting switching request in step S1015, the digital camera 201 receives the device specific ID of the printer 231 from it.

The digital camera 201 then searches the radio communication setting table held in the flash ROM 215 for the second radio communication setting by using the received device specific ID as a search key (step S1016). If the device specific ID is "0xD158492C", for example, "PRINT00A0B034" as the second ESS-ID and "3epio%98#PH3" as the second WEP key are obtained as search results in accordance with FIG. 6.

After that, the digital camera 201 switches to radio communication setting including these second ESS-ID and second WEP key (step S1017). The Ad-Hoc mode is used in this radio communication by the second radio communication setting. After that, the digital camera 201 restarts radio communication (step S1018).

On the other hand, if the digital camera 201 receives the inquiry about the device specific ID from the printer 231 in step S1009, the digital camera 201 transmits its device specific ID to the printer 231 in step S1119.

On the other hand, if the digital camera 201 receives the image file transmission request from the printer 231 in step S1010, the digital camera 201 transmits an image file corresponding to an image file ID transmitted at the same time (step S1020).

On the other hand, if in step S1011 the digital camera 201 performs radio communication by the second radio communication setting and receives the radio communication setting switching request from the printer 231, it transmits an accept response to this switching request (step S1021).

After that, the digital camera 201 performs radio communication setting in accordance with the first radio communication setting registered in the flash ROM 215 (step S1022), and restarts radio communication (step S1023).

On the other hand, if no new request has been generated from the printer 231 for the predetermined time T or more, the digital camera 201 performs radio communication setting in accordance with the first radio communication setting registered in the flash ROM 215 (step S1024), and restarts radio communication (step S1025).

In this manner, even if the printer 231 stops radio communication during execution of printing because, e.g., the power supply is turned off, control can be performed to switch to the first radio communication setting when the direct print process is completed, without explicitly exchanging data to restore radio communication by the first radio communication setting from radio communication by the second radio communication setting.

On the other hand, if the digital camera 201 receives a processing completion notification for the print request from the printer 231 in step S1013, the digital camera 201 terminates a series of printing sequences.

As described above, similarly to the first embodiment, even when a method by which the printer 231 requests the digital camera 201 to switch the radio communication settings is used, direct printing between the digital camera 201 and printer 231 is executed using radio communication by the second radio communication setting. Since the second WEP key is formed by using a random number or the like, it is difficult to intercept the contents of communication from a radio terminal which performs radio communication by the first radio communication setting. Also, after the direct print process is completed, radio communication by the original first radio communication setting is restored.

As has been explained above, image file transmission between the digital camera 201 and printer 231 is executed by using radio communication by the second radio communication setting, and this makes it difficult for a radio terminal which performs radio communication by the first radio communication setting to intercept the contents of communication.

Also, since the digital camera 201 and printer 231 alone perform radio communication by the second radio communication setting, steady transmission of broadcast packets from another radio communication terminal can be avoided. Accordingly, it is possible to prevent inconveniences such as a decrease in communication rate which occurs when processing of these packets interferes with transmission and reception of data of interest.

In addition, the second ESS-ID and second WEP key are transmitted and received by a wired connecting means such as a USB, i.e., they are neither transmitted nor received on radio communication by the first radio communication setting. Therefore, the possibility of a leak of these pieces of radio communication setting is extremely low.

Furthermore, this embodiment originally conceals the contents of communication by using the mechanism of encryption/decryption used in radio communication of the IEEE 802.11 standard. This advantageously obviates the need for an additional circuit or software for encrypting image data.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-287652 filed on Sep. 30, 2004, which is hereby incorporated herein by reference herein.

The invention claimed is:

1. A first radio communication apparatus, comprising:
a storage unit that stores a first radio communication setting for a first radio network, and a second radio communication setting for a second radio network which is different from the first radio network;
a radio communication unit that (a) starts radio communication with a second radio communication apparatus using the first radio communication setting, (b) transmits, to the second radio communication apparatus, a request for switching the first radio communication setting to the second radio communication setting, (c) receives, from the second radio communication apparatus, a response corresponding to the request for switching the first radio communication setting to the second radio communication setting, (d) starts radio communication with the second radio communication apparatus using the second radio communication setting after the response corresponding to the request for switching the first radio communication setting to the second radio communication setting is received from the second radio communication apparatus, (e) transmits a print request to the second radio communication apparatus after radio communication with the second radio communication apparatus using the second radio communication setting is started, and (f) starts radio communication with the second radio communication apparatus using the first radio communication setting after completing an operation corresponding to the print request transmitted to the second radio communication apparatus; and
a wired communication unit that receives the first radio communication setting and the second radio communication setting from the second radio communication apparatus before radio communication with the second radio communication apparatus using the first radio communication setting is started and before the request for switching the first radio communication setting to the second radio communication setting is transmitted to the second radio communication apparatus.

2. The first radio communication apparatus according to claim 1, wherein the first radio communication setting includes first encryption key information for encrypting data to be transmitted, and the second radio communication setting includes second encryption key information for encrypting data to be transmitted.

3. The first radio communication apparatus according to claim 1, wherein the first radio communication setting includes first ID information corresponding to the first radio network, and the second radio communication setting includes second ID information corresponding to the second radio network.

4. The first radio communication apparatus according to claim 1, further comprising:
a switching unit that switches the first radio communication setting to the second radio communication setting if the response corresponding to the request for switching the first radio communication setting to the second radio communication setting is received from the second radio communication apparatus.

5. The first radio communication apparatus according to claim 1, wherein the first radio communication apparatus includes a camera.

6. The first radio communication apparatus according to claim 1, wherein the radio communication unit (g) transmits, to the second radio communication apparatus, a request for switching the second radio communication setting to the first radio communication setting, (h) receives, from the second radio communication apparatus, a response corresponding to the request for switching the second radio communication setting to the first radio communication setting, and (i) starts radio communication with the second radio communication apparatus using the first radio communication setting after the response corresponding to the request for switching the second radio communication setting to the first radio communication setting is received from the second radio communication apparatus.

7. A method of controlling a first radio communication apparatus, the first radio communication apparatus having a first radio communication setting for a first radio network, and a second radio communication setting for a second radio network which is different from the first radio network, the method comprising:
starting radio communication with a second radio communication apparatus using the first radio communication setting;
transmitting, to the second radio communication apparatus, a request for switching the first radio communication setting to the second radio communication setting;
receiving, from the second radio communication apparatus, a response corresponding to the request for switching the first radio communication setting to the second radio communication setting;
starting radio communication with the second radio communication apparatus using the second radio communication setting after the response corresponding to the request for switching the first radio communication setting to the second radio communication setting is received from the second radio communication apparatus;
transmitting a print request to the second radio communication apparatus after radio communication with the second radio communication apparatus using the second radio communication setting is started;
starting radio communication with the second radio communication apparatus using the first radio communication setting after completing an operation corresponding to the print request transmitted to the second radio communication apparatus; and
receiving the first radio communication setting and the second radio communication setting from the second radio communication apparatus via a wired communication unit before radio communication with the second radio communication apparatus using the first radio communication setting is started and before the request for switching the first radio communication setting to the second radio communication setting is transmitted to the second radio communication apparatus.

8. The method according to claim 7, wherein the first radio communication setting includes first encryption key information for encrypting data to be transmitted, and the second radio communication setting includes second encryption key information for encrypting data to be transmitted.

9. The method according to claim 7, wherein the first radio communication setting includes first ID information corresponding to the first radio network, and the second radio communication setting includes second ID information corresponding to the second radio network.

10. The method according to claim 7, further comprising:
switching the first radio communication setting to the second radio communication setting if the response corresponding to the request for switching the first radio communication setting to the second radio communication setting is received from the second radio communication apparatus.

11. The method according to claim 7, wherein the first radio communication apparatus includes a camera.

12. The method according to claim 7, further comprising:
transmitting, to the second radio communication apparatus, a request for switching the second radio communication setting to the first radio communication setting;
receiving, from the second radio communication apparatus, a response corresponding to the request for switching the second radio communication setting to the first radio communication setting; and
starting radio communication with the second radio communication apparatus using the first radio communication setting after the response corresponding to the request for switching the second radio communication setting to the first radio communication setting is received from the second radio communication apparatus.

13. A second radio communication apparatus, comprising:
a storage unit that stores a first radio communication setting for a first radio network, and a second radio communication setting for a second radio network which is different from the first radio network;
a radio communication unit that (a) starts radio communication with a first radio communication apparatus using the first radio communication setting, (b) receives, from the first radio communication apparatus, a request for switching the first radio communication setting to the second radio communication setting, (c) transmits, to the first radio communication apparatus, a response corresponding to the request for switching the first radio communication setting to the second radio communication setting, (d) starts radio communication with the first radio communication apparatus using the second radio communication setting after the response corresponding to the request for switching the first radio communication setting to the second radio communication setting is transmitted to the first radio communication apparatus, (e) receives a print request from the first radio communication apparatus after radio communication with the first radio communication apparatus using the second radio communication setting is started, and (f) starts radio communication with the first radio communication apparatus using the first radio communication setting if a predetermined condition is satisfied after completing an operation corresponding to the print request received from the first radio communication apparatus; and
a wired communication unit that transmits the first radio communication setting and the second radio communication setting to the first radio communication apparatus before radio communication with the first radio communication apparatus using the first radio communication setting is started and before the request for switching the first radio communication setting to the second radio communication setting is received from the first radio communication apparatus.

14. The second radio communication apparatus according to claim 13, wherein the first radio communication setting includes first encryption key information for encrypting data to be transmitted, and the second radio communication setting includes second encryption key information for encrypting data to be transmitted.

15. The second radio communication apparatus according to claim 13, wherein the first radio communication setting includes first ID information corresponding to the first radio network, and the second radio communication setting includes second ID information corresponding to the second radio network.

16. The second radio communication apparatus according to claim 13, further comprising:
a switching unit that switches the first radio communication setting to the second radio communication setting if the response corresponding to the request for switching the first radio communication setting to the second radio communication setting is transmitted to the first radio communication apparatus.

17. The second radio communication apparatus according to claim 13, wherein the second radio communication apparatus includes a printer.

18. The second radio communication apparatus according to claim 13, wherein the radio communication unit (g) receives, from the first radio communication apparatus, a request for switching the second radio communication setting to the first radio communication setting, (h) transmits, to the first radio communication apparatus, a response corresponding to the request for switching the second radio communication setting to the first radio communication setting, and (i) starts radio communication with the first radio communication apparatus using the first radio communication setting after the response corresponding to the request for switching the second radio communication setting to the first radio communication setting is transmitted to the first radio communication apparatus.

19. A method of controlling a second radio communication apparatus, the second radio communication apparatus having a first radio communication setting for a first radio network, and a second radio communication setting for a second radio network which is different from the first radio network, the method comprising:
starting radio communication with a first radio communication apparatus using the first radio communication setting;
receiving, from the first radio communication apparatus, a request for switching the first radio communication setting to the second radio communication setting;
transmitting, to the first radio communication apparatus, a response corresponding to the request for switching the first radio communication setting to the second radio communication setting;
starting radio communication with the first radio communication apparatus using the second radio communication setting after the response corresponding to the request for switching the first radio communication setting to the second radio communication setting is transmitted to the first radio communication apparatus;
receiving a print request from the first radio communication apparatus after radio communication with the first radio communication apparatus using the second radio communication setting is started;
starting radio communication with the first radio communication apparatus using the first radio communication setting if a predetermined condition is satisfied after completing an operation corresponding to the print request received from the first radio communication apparatus; and transmitting the first radio communication setting and the second radio communication setting to the first radio communication apparatus via a wired communication unit before radio communication with the first radio communication apparatus using the first radio communication setting is started and before the request for switching the first radio communication setting to the second radio communication setting is received from the first radio communication apparatus.

20. The method according to claim 19, wherein the first radio communication setting includes first encryption key information for encrypting data to be transmitted, and the second radio communication setting includes second encryption key information for encrypting data to be transmitted.

21. The method according to claim 19, wherein the first radio communication setting includes first ID information corresponding to the first radio network, and the second radio communication setting includes second ID information corresponding to the second radio network.

22. The method according to claim 19, further comprising:
switching the first radio communication setting to the second radio communication setting if the response corresponding to the request for switching the first radio communication setting to the second radio communication setting is transmitted to the first radio communication apparatus.

23. The method according to claim 19, wherein the second radio communication apparatus includes a printer.

24. The method according to claim 19, further comprising:
receiving, from the first radio communication apparatus, a request for switching the second radio communication setting to the first radio communication setting;
transmitting, to the first radio communication apparatus, a response corresponding to the request for switching the second radio communication setting to the first radio communication setting; and
starting radio communication with the first radio communication apparatus using the first radio communication setting after the response corresponding to the request for switching the second radio communication setting to the first radio communication setting is transmitted to the first radio communication apparatus.

* * * * *